(12) United States Patent
Yoshida et al.

(10) Patent No.: US 9,505,302 B2
(45) Date of Patent: Nov. 29, 2016

(54) MISFUELING PREVENTING APPARATUS

(71) Applicant: ASTEER CO., LTD., Soja-shi (JP)

(72) Inventors: Hiromitsu Yoshida, Soja (JP); Takami Ono, Soja (JP)

(73) Assignee: ASTEER CO., LTD., Soja-shi (JP)

(*) Notice: Subject to any disclaimer, the term of this patent is extended or adjusted under 35 U.S.C. 154(b) by 146 days.

(21) Appl. No.: 14/510,508

(22) Filed: Oct. 9, 2014

(65) Prior Publication Data

US 2015/0102031 A1 Apr. 16, 2015

(30) Foreign Application Priority Data

Oct. 11, 2013 (JP) ................................ 2013-213554

(51) Int. Cl.
  *B60K 15/07* (2006.01)
  *B60K 15/077* (2006.01)
  *B60K 15/04* (2006.01)

(52) U.S. Cl.
  CPC ............ *B60K 15/077* (2013.01); *B60K 15/04* (2013.01); *B60K 2015/0461* (2013.01); *B60K 2015/0483* (2013.01)

(58) Field of Classification Search
  CPC .............. B60K 2015/0483; B60K 2015/0458; B60K 15/04
  USPC ................................. 141/312, 350; 220/86.2
  See application file for complete search history.

(56) References Cited

U.S. PATENT DOCUMENTS

| | | | | |
|---|---|---|---|---|
| 6,968,874 B1 * | 11/2005 | Gabbey | .................. | B60K 15/04 141/348 |
| 7,293,586 B2 * | 11/2007 | Groom | .................. | B60K 15/04 141/301 |
| 7,661,550 B2 * | 2/2010 | Feichtinger | ............ | B60K 15/04 137/588 |
| 7,665,493 B2 * | 2/2010 | Groom | .................. | B60K 15/04 141/350 |
| 7,967,041 B2 * | 6/2011 | Groom | .................. | B60K 15/04 141/350 |
| 7,967,042 B2 * | 6/2011 | Groom | .................. | B60K 15/04 141/350 |
| 8,714,214 B2 * | 5/2014 | Cisternino | ............ | B60K 15/04 141/348 |
| 8,726,950 B2 * | 5/2014 | Miller | .................... | B60K 15/04 141/311 R |
| 8,863,792 B2 * | 10/2014 | Kataoka | ................. | B60K 15/04 141/350 |
| 8,899,285 B2 * | 12/2014 | Hagano | .................. | B60K 15/04 141/350 |
| 2011/0139779 A1 | 6/2011 | Muller | | |
| 2012/0024422 A1 | 2/2012 | Cisternino | | |

FOREIGN PATENT DOCUMENTS

WO 2010/113063 A1 10/2010

\* cited by examiner

*Primary Examiner* — Timothy L Maust

(74) *Attorney, Agent, or Firm* — Fox Rothschild LLP

(57) ABSTRACT

A misfueling preventing apparatus discriminates a fuel filler nozzle based on an outer diameter of the fuel filler nozzle. The misfueling preventing apparatus includes a base, a first link arm, a second link arm, a flapper and a stopper. The first link arm has a first trigger projection. The second link arm has a second trigger projection. If the fuel filler nozzle of light diesel oil pushes the first trigger projection and the second trigger projection, the first link arm and second link arm swing to a direction to which the first link arm and second link arm open to, placing the flapper in an openable state.

10 Claims, 21 Drawing Sheets

MISFUELING PREVENTING APPARATUS

BACKGROUND OF THE INVENTION

1. Field of the Invention

The present disclosure relates to a misfueling preventing apparatus, which discriminates between a fuel filler nozzle for gasoline and a fuel filler nozzle for light diesel oil based on an outer diameter of a fuel filler nozzle to be inserted to a fuel filler port.

2. Description of the Related Art

An outer diameter of a fuel filler nozzle for fueling a light diesel oil (hereinafter sometimes referred to as "diesel nozzle") is larger than outer diameter of a fuel filler nozzle for fueling gasoline (hereinafter, referred to as gasoline nozzle). Apparatuses preventing an operator from misfueling (hereinafter, sometimes referred to as "misfueling preventing apparatus") which discriminate between the diesel nozzle and the gasoline nozzle are known. For example, the inventions disclosed in US 2012/0024422 A1, US 2011/0139779 A1, and WO 2010/113063 A1. These apparatuses discriminate a type of nozzle based on a difference of outer diameter between the diesel nozzle and the gasoline nozzle.

SUMMARY OF THE INVENTION

The apparatuses of US 2012/0024422 A1, US 2011/0139779 A1, and WO 2010/113063 A1 are provided with an annular member made of plastic. The annular member is called "actuator" in US 2012/0024422 A1, called "drive ring" in US 2011/0139779 A1, and called "ring" in WO 2010/113063, respectively. The annular member is divided by a slit, and can be elastically deformed and enlarged by inserting a nozzle therein. A flapper ("flapper door" in US 2012/0024422 A1, "flap" in US 2011/0139779 A1, "shutter" in WO 2010/113063 A1) is biased against an opening of the annular member. The tip of the flapper engages around the slit and is supported by edges of the annular member. If a nozzle whose outer diameter is larger than an inner diameter of the annular member is inserted into the annular ring, the nozzle elastically deforms and radially enlarges the annular member to disengage the tip of the flapper and allow the nozzle to open the flapper. Contrast to this, a nozzle whose outer diameter is smaller than the inner diameter of the annular member cannot enlarge the annular ring and disengage the tip of flapper from the annular member. As explained, the annular member discriminates between the diesel nozzle and the gasoline nozzle based on a size of a nozzle. However, known misfueling preventing apparatuses adapting the annular member as explained above has following defects.

In order to elastically deform the annular ring made of plastic, there is a limitation on a hardness of the annular ring. This limitation results in lowering in a mechanical strength and lowering in a durability of the annular ring. The annular ring is repeatedly enlarged by a nozzle. This results in a relaxation of stress of the annular ring with age. If the relaxation of stress progresses, the annular ring does not revert to an original shape and is left enlarged. This impairs a function of discriminating type of nozzle since a nozzle can open the flapper without contacting the annular ring.

The annular ring elastically deformed with a nozzle causes too much friction resistance when inserting the nozzle. Annular rings made of plastic tend to be made thick in the inserting direction of the nozzle so that a portion elastically deforming is not easily broken. Therefore, a portion slidably contacting to the nozzle becomes long too, and generates large friction resistance between the nozzle. This friction resistance is not overlooked when inserting the nozzle into the fuel filler port since it impairs an operational feeling of the nozzle when refueling.

This disclosure provides a misfueling preventing apparatus which can discriminate outer diameter of the nozzle, which is inserted into a fuel filler pipe, without adapting the annular ring made of plastic elastically deformed by being pressed with the nozzle.

Present disclosure is a misfueling preventing apparatus discriminating a fuel filler nozzle based on an outer diameter of the fuel filler nozzle. The misfueling preventing apparatus includes a base provided with a through hole inserting a fuel filler nozzle, placed across an inserting direction of the fuel filler nozzle to open and close a fuel filler port or a fuel filler pipe; a first link arm swung about a pivot shaft whose position is fixed to the base, provided around the through hole of the base, having a shape bending around the through hole of the base, swinging on a plane in parallel with a plane of the through hole, biased against a direction to which the first link arm and a second link arm close, having a first trigger projection projecting to an inside of the through hole of the base; the second link arm pivotally jointed to the first link arm with a joining shaft at one end, provided around the through hole to face the first link arm, having a shape bending around the through hole of the base, swinging on the plane in parallel with the plane of the through hole, biased against the direction to which the first link arm and the second link arm close (hereinafter referred to as closing direction), having a stopper on another end thereof and a second trigger projection projecting to the inside of the through hole of the base; and a flapper biased against the through hole of the base, whose position rotatably fixed to the base with a rotation shaft, having a stopper projection. A linear distance of the first trigger projection and the second trigger projection facing each other is larger than an outer diameter of a fuel filler nozzle of gasoline (gasoline nozzle). The linear distance is smaller than an outer diameter of a fuel filler nozzle of light diesel oil (diesel nozzle). The stopper projection of the flapper is supported by the stopper of the second link arm to prevent the flapper from rotating to an opening position. If the diesel nozzle pushes the first trigger projection and the second trigger projection, the first link arm and second link arm swing to a direction to which the first link arm and second link arm open (hereinafter referred to as opening direction) to disconnect the stopper projection and the stopper. If the diesel nozzle is inserted further, the flapper rotates to open. The gasoline nozzle is able to push either one of the first trigger projection and the second trigger projection. The flapper does not open by pressing either one of the first trigger projection and the second trigger projection.

It is preferable that each of the first trigger projection and the second trigger projection has an inclining face or an inclining edge on its upper side. The inclining face or the inclining edge descends to projecting direction of each of the first trigger projection or the second trigger projection. When inserting the diesel nozzle, the inclining face or the inclining edge slidably moves outside along the tip of diesel nozzle by being pressed down with the diesel nozzle to smoothly swing the first link arm and the second link arm to the opening direction.

It is preferable that the first link arm and the second link arm are biased to the closing direction with an elastic ring. One end of the elastic ring engages to the first link arm, and another end of the elastic ring engages to the second link arm. The elastic ring is externally fitted to the first link arm and the second link arm over the joining shaft. If the first link arm and/or second link arm swing/swings, the elastic ring enlarges to bias the first link arm and second link arm to the closing direction. If an external force applied to the first link arm and/or second link arm is removed, the first link arm and the second link arm return to a default position.

Alternatively, another elastic ring having a linear portion is adaptable. One end of the elastic ring slidably contacts to the first link arm, and another end of the elastic ring slidably contacts to the second link arm. The elastic ring is externally fitted to the first link arm and the second link arm over the joining shaft. The linear portion of the elastic ring is supported by the base. If the first link arm and/or the second link arm swing/swings, the elastic ring enlarges to bias the first link arm and the second link arm to the closing direction. One end and another end of the elastic ring slides with respect to the first link arm and the second link arm when the elastic ring enlarges. If an external force applied to the first link arm and/or second link arm is removed, the first link arm and the second link arm return to a default position.

The flapper may be configured by a plate having at least one concaved groove on or next to the stopper projection. Flapper may be configured by a plate having at least one pair of slits along an extending direction of the stopper projection. The concaved groove or slit facilitates the flapper to elastically deform when too much load is applied on the flapper, and prevents the flapper from being destroyed with too much load.

It is preferable that the apparatus further include an upper housing coupled to the base. The first link arm and the second link arm are supported by a plurality of supporting projections provided on the base and a plurality of supporting projections provided on the upper housing to swing. By coupling the upper housing and the base, misfueling preventing apparatus is modularized. Modularized apparatus is easy to handle and install. Plurality of supporting projections of the upper housing and the base prevents the first link arm and the second link arm from being detached when they swing.

Misfueling preventing apparatus may further include a spacer. The spacer is externally fitted to the base. Inner diameter of a fuel filler pipe sometimes varies depending on a type of vehicle. By exchanging the spacer depending the type of vehicle, a misfueling preventing apparatus having the same specification can be installed. This facilitates to reduce a car manufacturing cost.

DETAILED DESCRIPTION OF THE PREFERRED EMBODIMENTS

Figure 7:
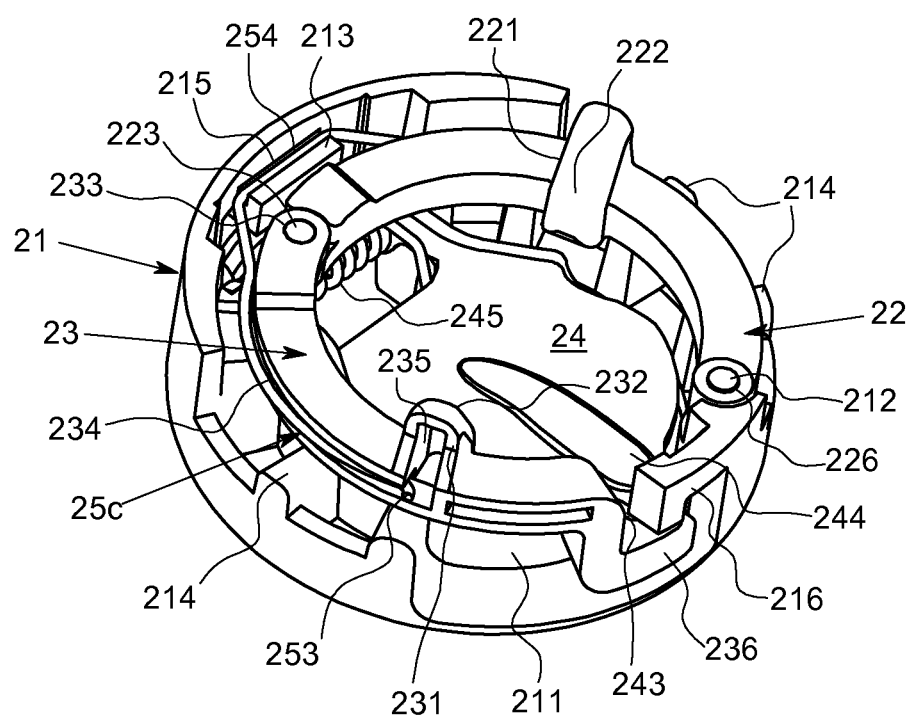
FIG. 7 is a perspective view illustrating the misfueling preventing apparatus of another embodiment, which is seen from an upper side, in which the upper housing is detached.
Figure 8:
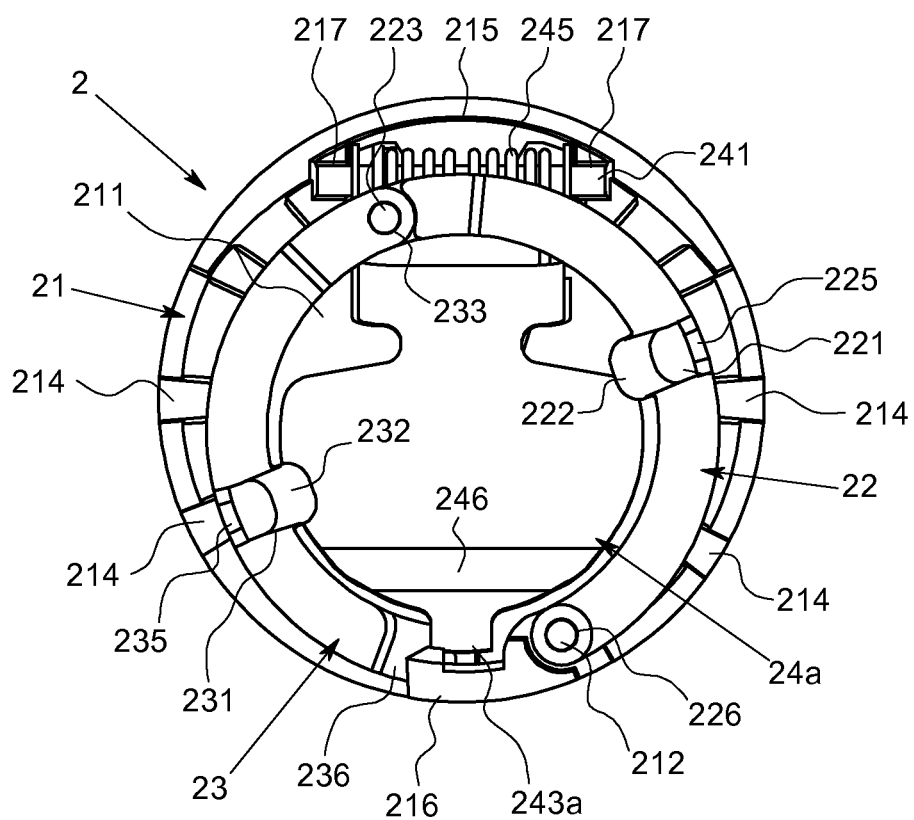
FIG. 8 is a plain view illustrating the misfueling preventing apparatus of still another embodiment, in which the upper housing is detached.
Figure 9:
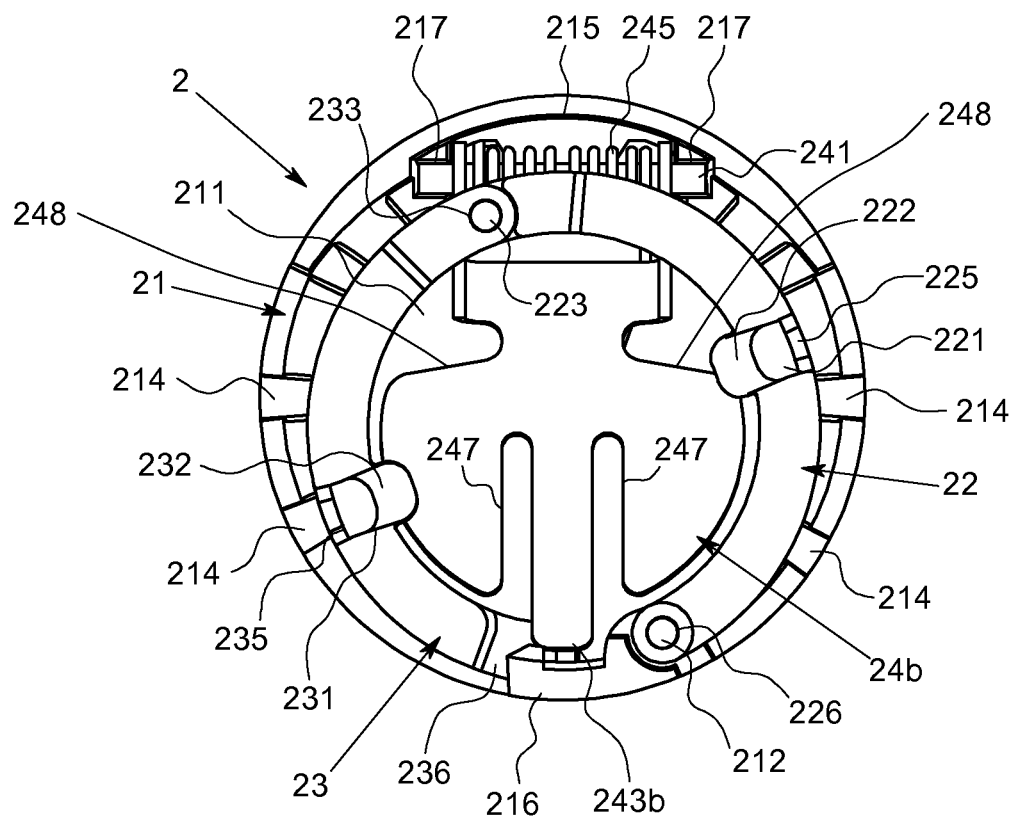
FIG. 9 is a plain view illustrating the misfueling preventing apparatus of still another embodiment, in which the upper housing is detached.

Embodiments of the present disclosure is explained with reference to Figs. For a convenience of explanation, a direction to which a fuel filler nozzle 3 or 4 is inserted is referred to as "lower side". The opposite direction to the lower side is referred to as "upper side". Direction to which a first link arm 22 is located in a plain view, such as FIGS. 5, 8, 9, 14, 16, 18, 20, is referred to as "right side". Direction to which a second link arm 23 is located in a plain view of a misfueling preventing apparatus 2, such as FIGS. 5, 8, 9, 14, 16, 18, 20, is referred to as "left side". FIGS. 1 to 6 and FIGS. 10 to 21 illustrate an embodiment of the present disclosure. FIG. 7 illustrates another embodiment of the present disclosure. FIG. 8 illustrates still another embodiment of the present disclosure. FIG. 9 illustrates still another embodiment of the present disclosure.

Figure 10:
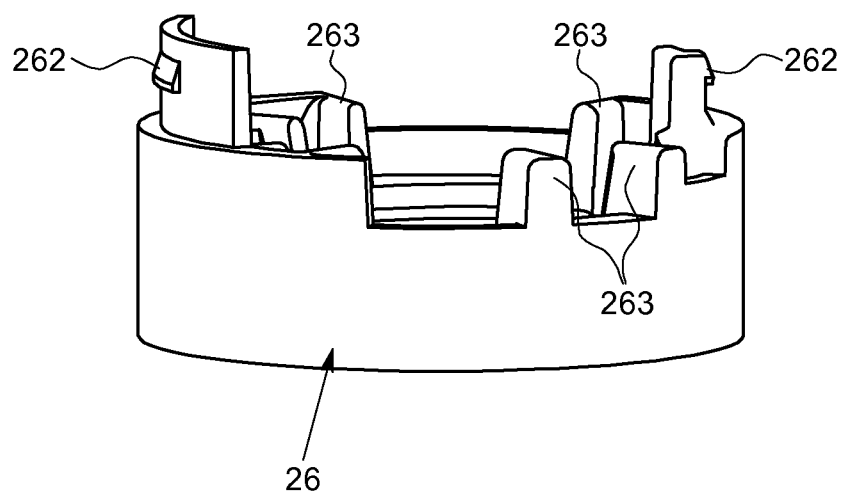
FIG. 10 is a perspective view illustrating the upper housing, in which the upper housing is inverted.
Figure 11:
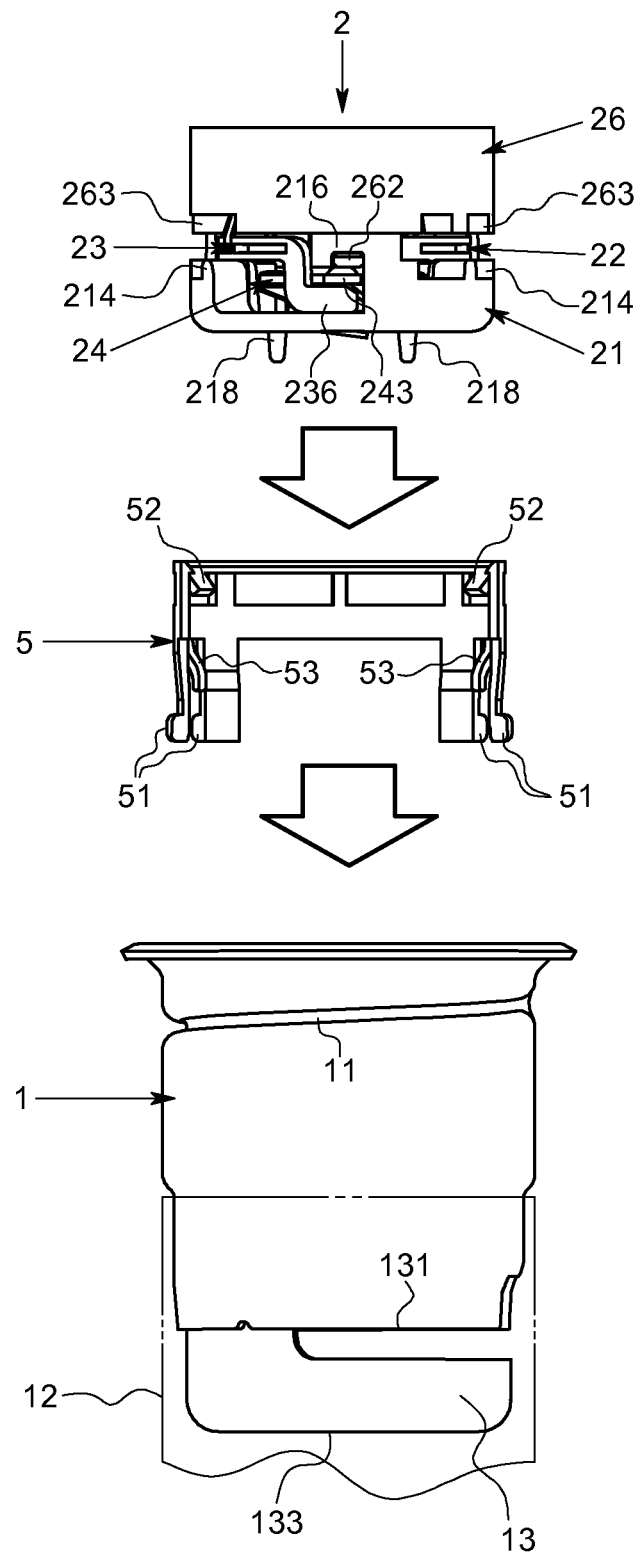
FIG. 11 is a side view illustrating how to assemble the misfueling preventing apparatus of FIG. 1 with respect to a fuel filler port.

The embodiment illustrated in FIGS. 1 to 6 and FIGS. 10 to 21 is explained in the following. A misfueling preventing apparatus 2 of this embodiment includes a base 21 to which a first link arm 22, a second link arm 23 and a flapper 24 are assembled as illustrated in FIGS. 1 to 6. The base 21 is assembled with an upper housing 26 to integrate thereof and configure a modularized misfueling preventing apparatus. The integrated base 21 and the upper housing 26 are assembled and fitted in the fuel filler port 12 intervening a spacer 5, as illustrated in FIG. 11. A fuel filler cap, not illustrated in Figs, is screwed on the fuel filler port 12. The modularized misfueling preventing apparatus may be assembled and fitted in an upper end of a fuel filler pipe 12 without placing a spacer 5. In case the spacer 5 is not placed, an outer peripheral face or outer peripheral edge of the base 21 may be closely fitted to an inner peripheral face of a fuel filler pipe to attach thereof. The modularized misfueling preventing apparatus is mountable to various fuel filler pipes or fuel filler ports by exchanging the spacer 5, and is easy to handle since each member is integrated. A spacer 5 functions as a cover to protect a base inside thereof.

Figure 1:
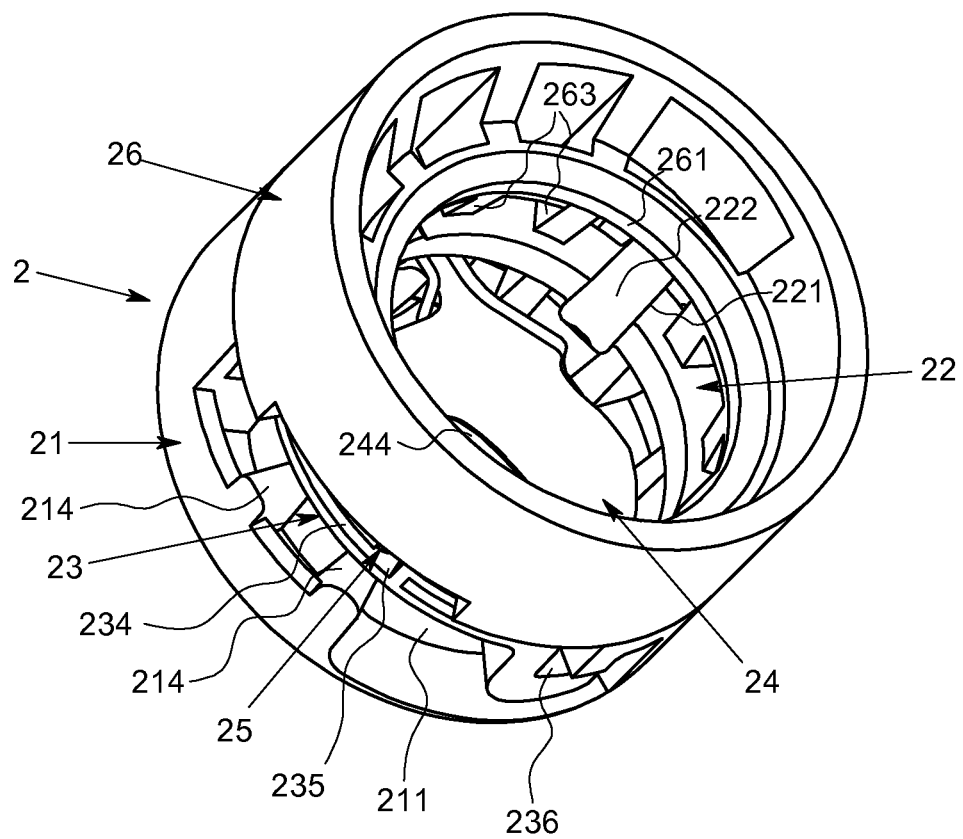
FIG. 1 is a perspective view illustrating an embodiment of a misfueling preventing apparatus of the present disclosure.
Figure 2:
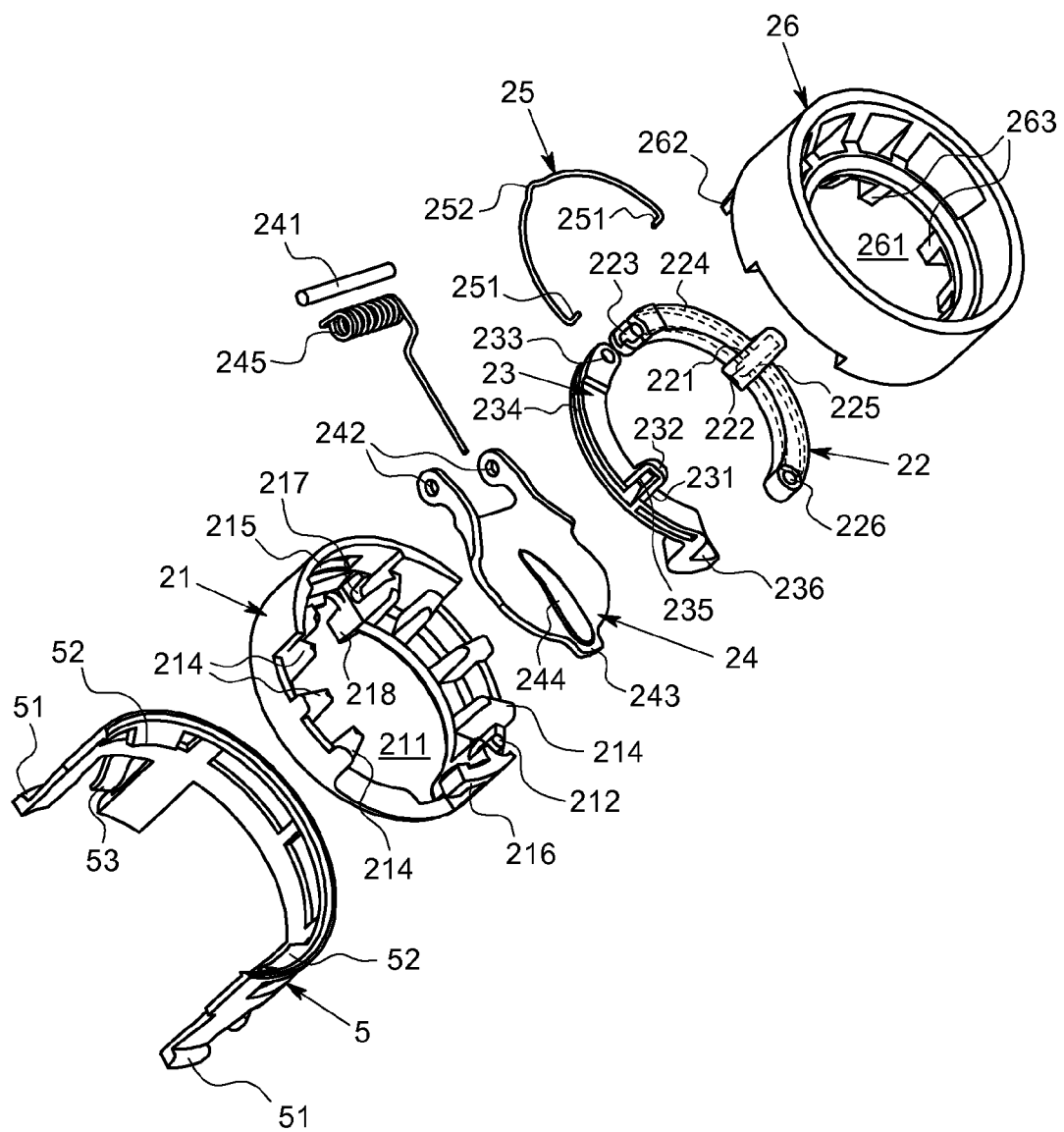
FIG. 2 is an exploded perspective view illustrating the misfueling preventing apparatus of FIG. 1.
Figure 3:
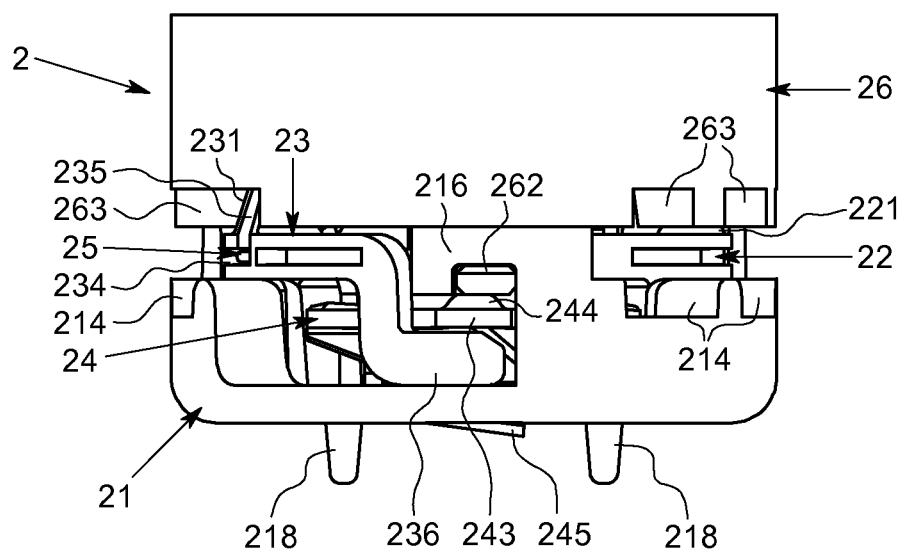
FIG. 3 is a side view illustrating the misfueling preventing apparatus of FIG. 1.
Figure 4:
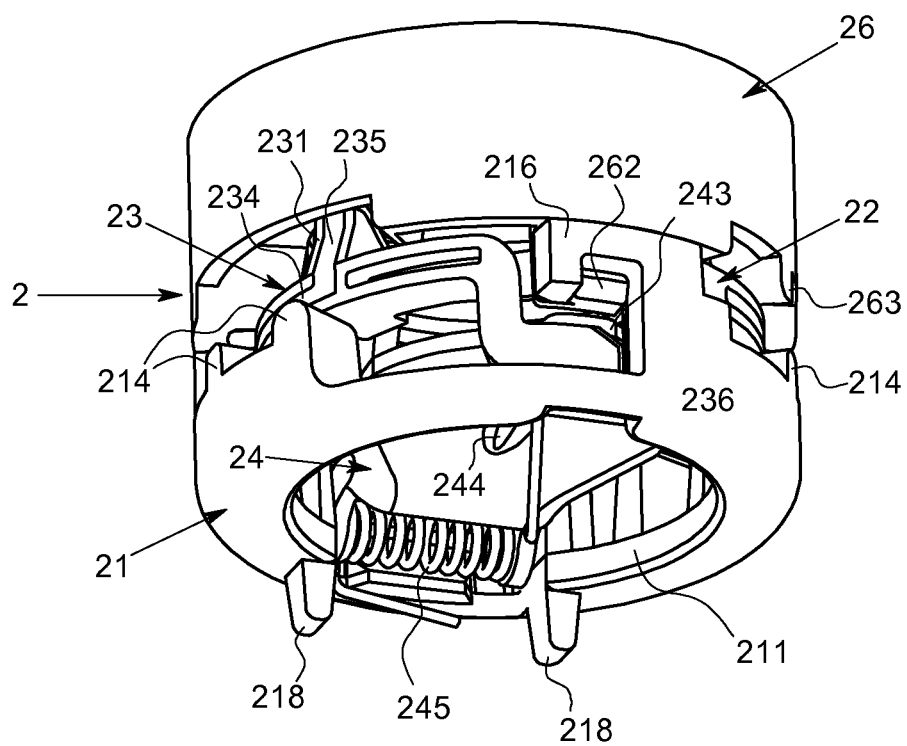
FIG. 4 is a perspective view illustrating the misfueling preventing apparatus of FIG. 1, which is seen from a lower side.

As illustrated in FIG. 2, the spacer 5 is a member having a half arc shaped peripheral face in plain view. The peripheral face has a thickness filling a gap between an outer peripheral face of the upper housing 26 and an inner peripheral surface of the fuel filler port 1. The spacer 5 is made of, for example, a plastic material. The spacer 5 has a pair of engaging projections 52, 52 at inside of upper end thereof. The pair of engaging projections 52, 52 are arranged by a point symmetry, and engages with upper edge of the upper housing 26. The spacer 5 has four flaps protruding to lower side at lower edge thereof. Each flap has an engaging projection 51. Each engaging projection 51 engages to a slit 131 of the fuel filler port 1. As illustrated in FIG. 11, pressing pieces 53, 53 which elastically deform are provided between the plurality of flaps. The pressing pieces 53, 53 press the upper housing 26 to radially inside. Structure of a spacer may be decided depending on a structure of a base, an upper housing and a fuel filler port.

The base 21 is a ring shaped member having a circular through hole 211 at the center. The base 21 is made of, for example, a plastic material. The base 21 has a plurality of supporting projections 214 on an upper side thereof. The plurality of supporting projections 214 is intermittently provided on upper face of the ring shaped member in a circumferential direction of the ring shaped member to surround approximately ⅔ of circumference of the through hole 211. Each supporting projection 211 is a long block extends in radial direction of the through hole 211. The base 21 has a pivot shaft 212 projecting to upper side between the plurality of supporting projections 214. A pivot shaft may be provided on the first link arm. In that case, a shaft hole is provided on the base. A receiving hook 216 projecting horizontally left side is provided on immediate left side of the pivot shaft 212. A peripheral wall having a receiving groove 215 is provided on an opposite side of the pivot shaft 212 and the receiving hook 216. A pair of left and right bearings 217, 217 is provided on the radially inside to the peripheral wall. A pair of left and right flapper stoppers 218, 218 projecting to lower side and stopping the rotation of a flapper 24 is provided on a lower face of the base 21.

As described above, the base 21 has a circular through hole 211. The through hole 211 has a hole projecting radially outside at a portion where a stopper projection 243 of the flapper goes through. This hole communicates to the through hole 211 and allows the stopper projection 243 to go therethrough. Shape of the through hole is not particularly limited to the circle in plain view. Shape of the base is not particularly limited to the circle in plain view as well. Since the shape of the base influences the shape of the modularized misfueling preventing apparatus and the cross section of the fuel filler pipe and the fuel filler port is circle, the shape of base 21 is designed as circle in this embodiment.

Plurality of supporting projections 214 supports the first link arm 22 and the second link arm 23 from lower side. Plurality of supporting projections 214 slidably contacts to a lower face of the first link arm 22 and the second link arm 23 when the first link arm 22 and the second link arm 23 swing as described later in FIGS. 16, 18 and 20. The plurality of supporting projections 214 specifies a plane on which the first link arm 22 and the second link arm swing. Since the plurality of supporting projections 214 partially contacts to the first link arm 22 and the second link arm 23, a frictional resistance therebetween is reduced. Each supporting projection 214 is chamfered at corners bounding an upper face and side faces thereof, so that the first link arm 22 and second link arm 23 do not trip at corners when they slide. As described later, the first link arm 22 and the second link arm 23 are sandwiched with supporting projections 214 on base side and supporting projections 263 on upper housing side so that the first link arm 22 and the second link arm 23 can swing without bumping. Supporting projections 214 on base side and supporting projections 263 on upper housing side may be arranged at the same position in a circumferential direction, or be shifted at the different position in the circumferential direction.

A shaft hole 226 provided on one end of the first link arm 22 is externally fitted to the pivot shaft 212 which function as a center of swing motions. As explained above, since the first link arm 22 is sandwiched with the supporting projections 214 on the base side and the supporting projections 263 on the upper housing side, the first link arm 22 does not come off in this embodiment. A measure preventing the first link arm 22 from coming off is not taken with respect to the pivot shaft 212. A measure utilizing a key and a key groove which can be come off at specified angle may be taken with respect to the pivot shaft 212 as another configuration.

The base 21 and the upper housing 26 are unified by engaging a pair of engaging projections 262, 262 to the receiving groove 215 and the receiving hook 216 of the base 21. The receiving groove 215 is proved on the peripheral wall of the base 21. The receiving hook 216 is provided by a point symmetry with respect to the receiving groove 215. The engaging projections 262, 262 on the upper housing 26 are provided at a position corresponding to a position of the receiving groove 215 and the receiving hook 216. As illustrated in FIG. 10, the engaging projections 262, 262 protrude from the peripheral wall of the upper housing 26 to lower side. If the base 21 and the upper housing 26 are unified and modularized, the first link arm 22 and the second link arm 23 are sandwiched and supported with the supporting projections 214 and the supporting projections 263.

The upper housing 26 has a cylindrical shape, and is, for example, made of a plastic material. The upper housing 26 has a guiding hole 261 at a center thereof, as illustrated in FIGS. 2 and 10. The guiding hole 261 is concentric and the same as the through hole 211 of the base 21. The plurality of supporting projections 263 is intermittently provided on an upper side (see FIG. 13) and lower side (see FIG. 2) of an edge of the guiding hole 261 to surround the guiding hole 261. Each supporting projection 263 is a long block extends in radial direction of the guiding hole 261. Upper side of each supporting projection 263 on upper side is configured as an inclining face descending to radially inside of the guiding hole 261. Another inclining face descending to radially inside is provided around the guiding hole 261. A fuel filler nozzle is guided to the through hole 211 with the inclining face on the upper side of each of the supporting projection 263 and the inclining face around the guiding hole 261. The inclining face of the supporting projection 211 may be configured as a hollow block having an inclining edge. The guiding hole 261 facilitates the fuel filler nozzle to straightly insert to the through hole 211, and facilitates a tip or outer peripheral surface of the fuel filler nozzle to evenly contact to the first trigger projection 221 and the second trigger projection 231. The guiding hole 261 prevents the fuel filler nozzle from pushing either one of the first trigger projection 221 and the second trigger projection 231, and prevents a frictional resistance from being increased.

Both ends of a rotation shaft 241 of the flapper 24 is fitted to the pair of left and right bearings 217, 217 from upper side. The rotation shaft 241 is inserted into a pair of shaft hole 242, 242 of the flapper 24. The pair of bearings 217, 217 function as a center of rotation. When the base 21 and the upper housing 26 are fitted each other, both ends of the rotation shaft 241 are pressed with the peripheral wall having the engaging projection 262 (see FIG. 10) of the upper housing 26. This prevents from the rotation shaft 241 from being detached. As another configuration, a measure utilizing a member made integral with or separate from the bearings 217 may be taken.

Figure 12:
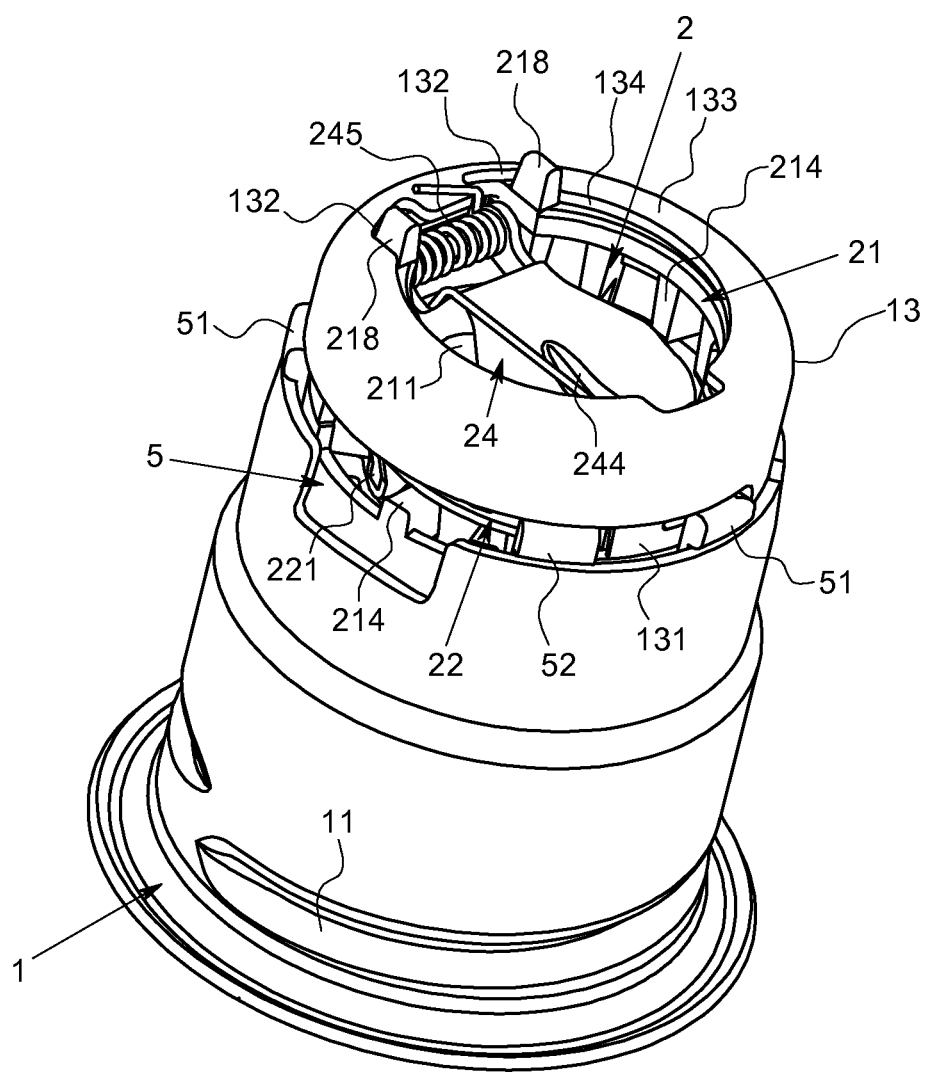
FIG. 12 is a perspective view illustrating the misfueling preventing apparatus of FIG. 1 installed on the fuel filler port, in which the apparatus and the fuel filler port are inverted.
Figure 13:
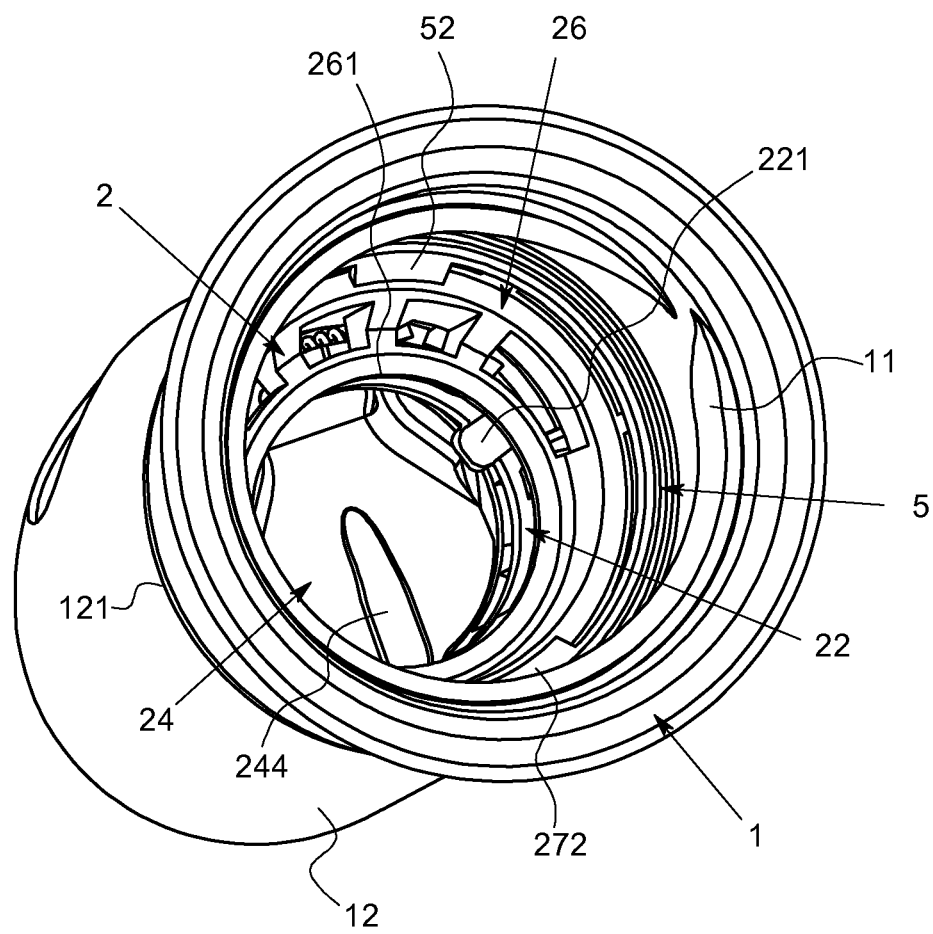
FIG. 13 is a perspective view illustrating a fuel filler pipe coupled with a fuel filler port assembled with the misfueling preventing apparatus of FIG. 1.

As illustrated in FIG. 12, the pair of left and right flapper stoppers 218, 218 of the base 21 engages a pair of stopper receiver 132, 132 (see FIG. 10) to circumferential direction provided on a lower face of a supporting bracket 13 of a fuel filler port 1 to which the base 21 abuts. This prevents from the misfueling preventing apparatus 2 from rotating with respect to the fuel filler port 1 by stop rotating the base 21. An inner diameter of an opening provided on a fuel filler port 1 is sometimes made larger than an inner diameter of a fuel filler pipe, and center of the opening is sometimes eccentric with respect to the fuel filler pipe. In such case, if the misfueling preventing apparatus rotates around the fuel filler port, it is sometimes difficult to insert a fuel filler nozzle since the flapper collides. It is effective to provide flapper stoppers 218 in the case.

Each of the first link arm 22 and the second link arm 23 has a shape of half arc extending along the through hole 211 in plain view, and has a shape of a substantially flat in side view, and has a length corresponding to approximately half of a circumferential length of the through hole 211, and is made of, for example, a plastic material. Strength and durability of the first link arm 22 and the second link arm 23 are enhanced using a fiber reinforced plastic. Shape of the first link arm 22 and the second link arm 23 is not necessary to be half ark arc in plain view, and may be for example a polygonal curve. However, it is preferable to adapt the half arc since a space is limited. The first link arm 22 and the second link arm 23 may be provided inside or outside of the through hole 211 since the first link arm 22 and the second link arm 23 has the first trigger projection 221 and the second trigger projection 231 projecting to the inside of the through hole 211.

The shaft hole 226 is provided on one end of the first link arm 22, and the joining shaft 223 is provided on another end in present embodiment. The shaft hole 226 is a cylindrical shape having a hole penetrating upper side to lower side. The joining shaft 223 is a shaft protruding to upper side. The shaft hole 226 on one end is externally fitted to the pivot shaft 212 on the base 21. The joining shaft 223 on another end is externally fitted with a shaft hole 233 of the second link arm 23. The pivot shaft 212 and the joining shaft are arranged by point symmetry. The first link arm 22 has the first trigger projection 221 projecting radially inside direction of the through hole 211 at approximately half point of the arc.

The first trigger projection 221 has an inclining face 222 descending to radially inside direction of the through hole 211. The inclining face may be configured as a hollow block having an inclining edge.

The shaft hole 233 is provided on one end of the second link arm 23, and a stopper 236 is provided on another end of the second link arm 23 in present embodiment. The shaft hole 233 is a cylindrical shape having a hole penetrating upper side to lower side. The stopper 236 is a step configured by bending another end of the second link arm 23 to lower side and extending another end to circumferential direction. The shaft hole 233 on one end is externally fitted to the joining shaft 223 of the first link arm 22. The stopper 236 on another end positions under the receiving hook 216. The stopper projection 243 of the flapper 24 is between the stopper 236 and the receiving hook 216 and contacts both of them. The stopper 236 prevents the flapper 24 from rotating downwardly to an opening position. The second link arm 23 has the second trigger projection 231 projecting radially inside direction of the through hole 211 at approximately half point of the arc.

The second trigger projection 231 has an inclining face 232 descending to radially inside direction of the through hole 211. The inclining face may be configured as a hollow block having an inclining edge.

The fuel filler nozzle 4 mainly contacts to the first trigger projection 221 and the second trigger projection 231, not arm portion of the link. This lowers frictional resistance when inserting the fuel filler nozzle 4 to enhance an operation feeling. If the inclining faces 222,232 or inclining edges are provided on the first trigger projection 221 and the second trigger projection 231, contacting portion shifts from a tip of the fuel filler nozzle 4 to an outer peripheral face to further enhance the operation feeling.

As illustrated in FIG. 2, the first link arm 22 has a short groove 225 which engaging an end of the elastic ring 25 on a radially outside of the first trigger projection 221, and has a long groove 224 which communicates to the short groove 225 on an outside face thereof in circumference direction. The second link arm 23 has a short groove 235 which engaging an end of the elastic ring 25 on a radially outside of the second trigger projection 231, and has a long groove 234 which communicates to the short groove 235 on an outside face thereof in circumference direction. The elastic ring 25 has a shape of half arc, and has both ends (end portions 251, 251) bent upwardly, and has a projecting portion 252 at the middle projecting to radially outside not to interfere with the joining shaft 223. The elastic ring 25 fitted to the long grooves 225,234 and the short grooves 225, 235. The projecting portion 252 prevents from a force biasing the first link arm 23 and the second link arm 24 discontinuing thereat. The elastic ring 25 is made of a metal having elasticity such as a steel for a spring. The elastic ring 25 try to diminish a diameter thereof if the diameter of the elastic ring 25 is enlarged to bias the first link arm 22 and the second link arm 23 to closing direction. The misfueling preventing apparatus adapting the elastic ring 25 has a fine operating feeling. The first link arm and the second link arm may be biased with a coil spring or a leaf spring instead of the elastic ring.

The elastic ring 25 have the first link arm 22 and the second link arm 23 swing together. If the either one of the first trigger projection 221 and the second trigger projection 231 is pushed with the fuel filler nozzle of gasoline, the first link arm 22 and the second link arm 23 swing together to a direction on which a pushed link arm locates. For example, the fuel filler nozzle 4 pushes the first trigger projection 221, the first link arm 21 is pushed directly with the fuel filler nozzle 4 to displace to right side and enlarge the elastic ring 25. The second link arm 23 swings to follow the first link arm 22 by being pulled with the joining shaft hole 223 and being pushed by the enlarged elastic ring 25 generating a biasing force.

The flapper 24 is a plate having a substantially circular shape in plain view as illustrated in FIG. 2, and has a size substantially closing the circular through hole 211, and is made of, for example, a metal material. The flapper 24 may have a small gap between the through hole 211. For example, as illustrated in FIG. 9, a fuel supply can be automatically stopped with auto fuel stopping system of the fuel filler nozzle 4 even though the small slit such as a first slits 247,247 and a second slit 248, 248 and other small gaps are provided. The auto fuel stopping system stops supplying a fuel by detecting, for example, a pressure rise elicited by an evaporated fuel. However, a fuel can be supplied into a fuel filler tank with an elastic nozzle of a portable fuel can, which does not have the stopping system. The small gap may be preferably provided considering a possibility of refueling during an emergency.

The flapper 24 has a pair of left and right flanges projecting in parallel with each other to upper side from an outer periphery on a base side as illustrated in FIG. 2. The flange has a pair of shaft holes 242,242. A rotation shaft 241 is inserted into a torsion coil spring 245 having an inner diameter larger than thereof. The both ends of the rotation shaft 241 are fitted to the shaft holes 242, 242 to attach the flapper 24 to the base 21. One end of the torsion coil spring contacts to a lower face of the flapper 24 and another end thereof contacts to the base 21. A position where the through hole 211 is closed with the flapper 24 is referred to as closing position, and position where the flapper 24 rotates to lower side is referred to as opening position. The flapper 24 is pressed against by the torsion coil spring 245 with respect to the closing position.

In this embodiment, the stopper projection 243 of the flapper projects from an outer periphery of the flapper 24, and projects to a direction orthogonal to rotation shaft of the flapper 24, and positions where the stopper projection 243 interferes with the stopper 236 next to the pivot shaft 212. Since a load applied from the fuel filler nozzle 4 is prevented from being unevenly apply on the flapper 24 in this configuration, the flapper 24 is prevented from being destroyed. The rotation shaft of the flapper 24 and the joining shaft 223 come close, and the pivot shaft 212 and the stopper 236 and the stopper projection 243 come close. The former ones and latter ones are arranged by a point symmetry.

Figure 5:
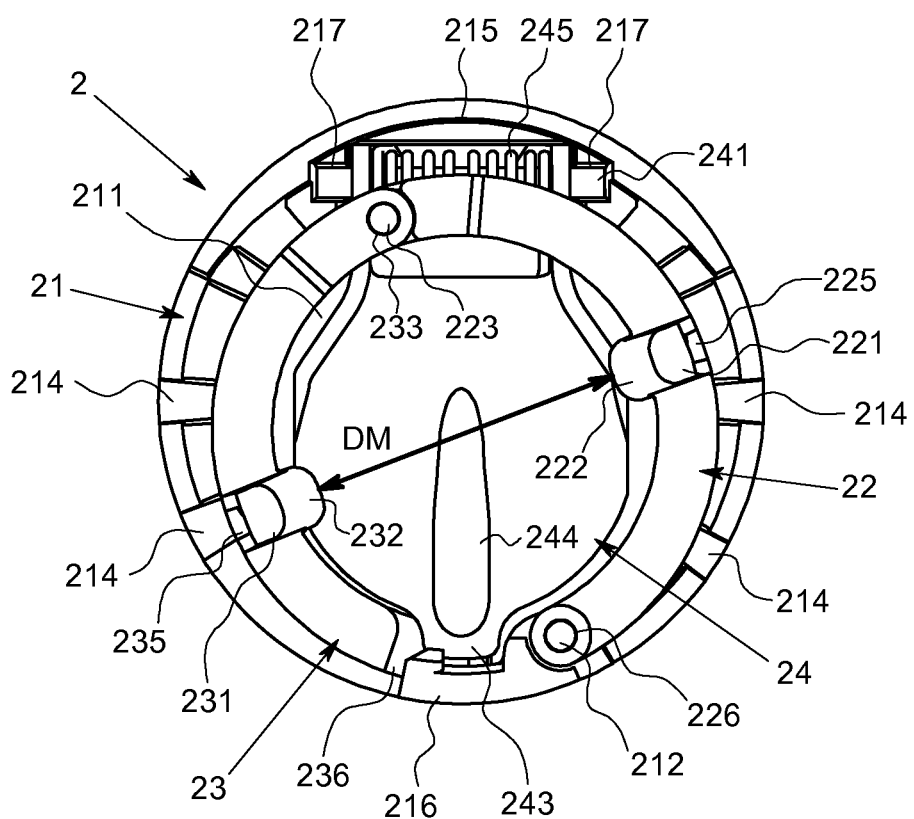
FIG. 5 is a plain view of the misfueling preventing apparatus of FIG. 1, in which an upper housing is detached.
Figure 6:
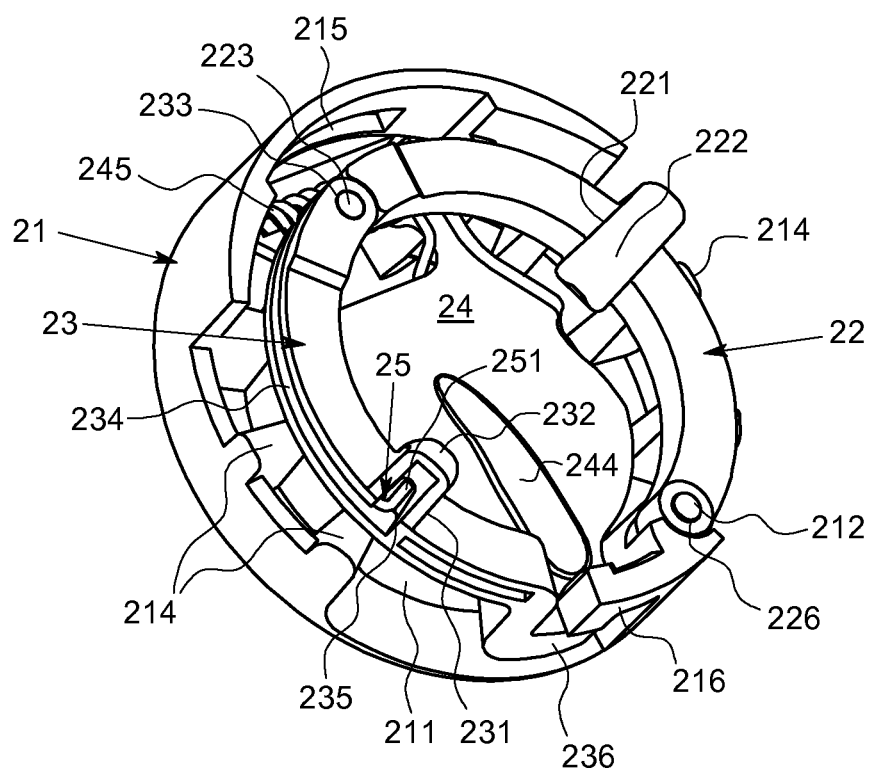
FIG. 6 is a perspective view illustrating the misfueling preventing apparatus of FIG. 1, which is seen from an upper side, in which the upper housing is detached.

The flapper 24 has a linear concaved portion 244 concaved from plate face to lower side and provided along a direction orthogonal to an extending direction of the rotation shaft 241 to enhance a mechanical strength as illustrated in FIG. 5. The linear concaved portion 244 prevents the flapper 24 from bowing if the fuel filler nozzle is pressed to the flapper 24 to maintain the closing position.

The fuel filler port 1 is a cylindrical member made of a metal material configured by an upper cylinder and a lower cylinder having a smaller outer diameter than the upper cylinder. The upper cylinder and the lower cylinder continue via a step. A female screw 11 is provided on the upper cylinder. Inside of the lower cylinder is inserted with a supporting bracket 13 from lower side to weld and fix each other. The supporting bracket 13 is a cylindrical member made of a metal material, and has a communicating hole 134. As illustrated in FIG. 11, the fuel filler port 1 and the fuel filler pipe 12 are fixed by inserting the supporting bracket 13 of the fuel filler port 1 to the fuel filler pipe 12 and welding them. A slit 131 is provided between the supporting bracket 13 and a lower end of the lower cylinder. The slit 131 has a shape cutting a portion of peripheral face of the supporting bracket 13. A circular flange is provided around the communicating hole 134. The circular flange functions as a face receiving a bottom face of the base 21 (receiving flange 133) as described later. As illustrated in FIG. 12, a pair of cut outs (stopper receivers 132, 132) are provided on the communicating hole 134 communicating to the communicating hole 134 which function as projections receiving a pair of flapper stoppers 218, 218.

An assembling sequence of misfueling preventing apparatus 2 with respect to the fuel filler port 1 is explained. The spacer 5 is inserted from upper side to the fuel filler port 1 having the supporting bracket 13. Position of the spacer 5 is fixed by engaging the engaging projections 51, 51 of the spacer 5 to the slit 131 of the fuel filler port 1. The modularized misfueling preventing apparatus 2 configured by coupling the base 21 and the upper housing 26 inserted into the spacer 5. The lower side of the base 21 is pressed against the receiving flange 133 while engaging the flapper stoppers 218, 218 provided on the lower face of the base 21 to the stopper receivers 132, 132 of the supporting bracket 13. The spacer 5 and the upper housing 26 are unified by engaging the engaging projections 52,52 to the upper edge of the upper housing 26. In this embodiment, welding or screws are not used when assembling the misfueling preventing apparatus with respect to the fuel filler port 1. Since the fuel filler pipe 12 covers, the slit 131 of the fuel filler port 1 does not communicate an inside and outside of the fuel filler pipe 12.

Position of the misfueling preventing apparatus 2 is fixed by being sandwiched with the receiving flange 133 of the supporting bracket 13 fixed on the fuel filler port 1 and the engaging projections 52,52 of the spacer 5 whose position is fixed to the fuel filler port 1, as illustrated in FIG. 11. Pressing pieces 53, 53 pressing the upper housing 26 against radially inside are provided on the spacer 5 to prevent rattling of the upper housing 26. The pair of flapper stoppers 218,218 projects to lower side from lower face of the base 21 and engages to the pair of stopper receivers 132,132 of the supporting bracket 13. Opening and closing direction of the flapper 24 is specified with respect to the fuel filler port 1 and the fuel filler piper 12 by preventing the base 21 from rotating with the flapper stoppers 218,218. The guiding hole 261, the through hole 211, and the communicating hole 134 communicate each other and are concentric. The fuel filler nozzle 3 is inserted to the fuel filler pipe 12 via the guiding hole 261, the through hole 211, and the communicating hole 134.

Figure 14:
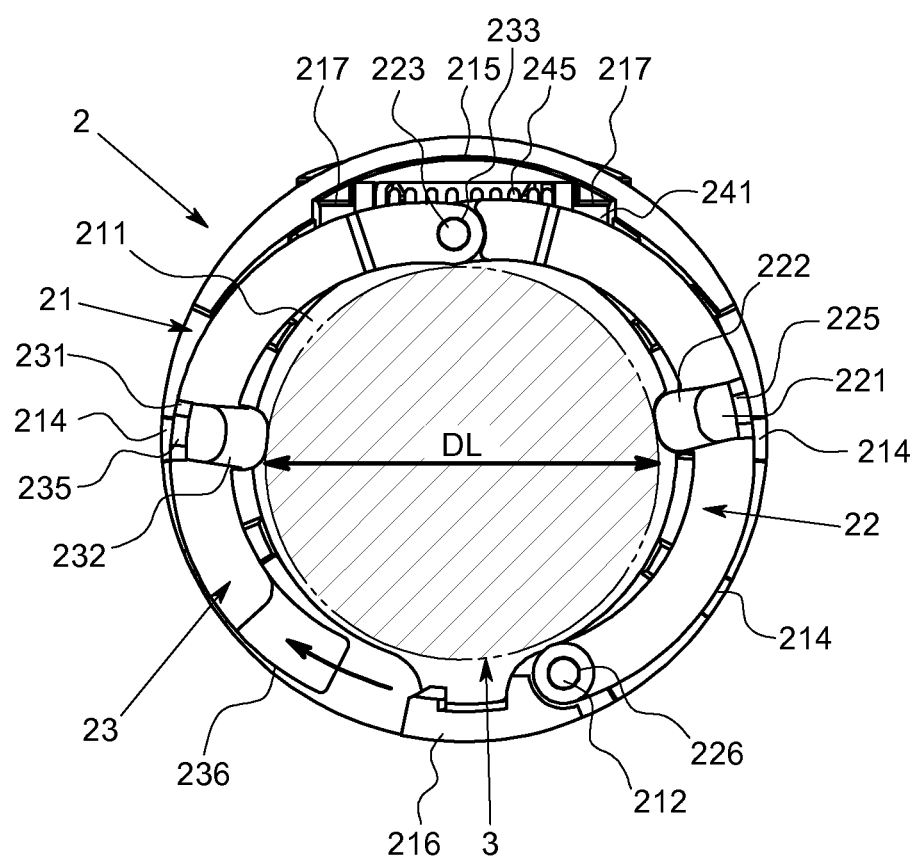
FIG. 14 is plain view illustrating the misfueling preventing apparatus of FIG. 1, in which the upper housing is detached, a fuel filler nozzle of light diesel oil is inserted.
Figure 16:
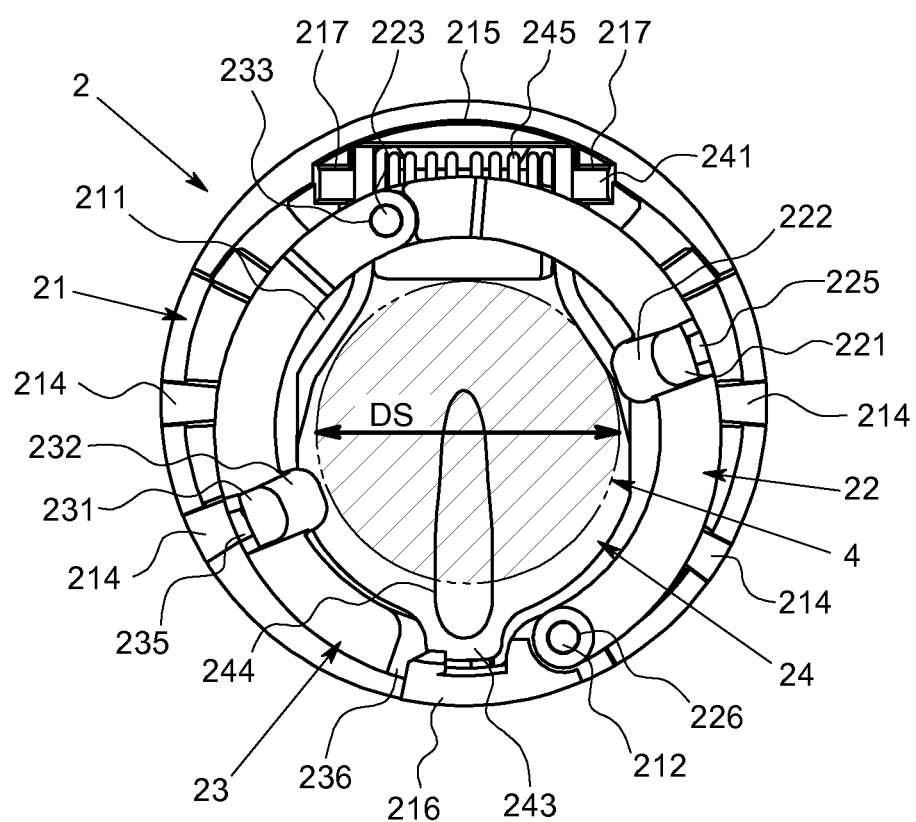
FIG. 16 is a plain view illustrating the misfueling preventing apparatus of FIG. 1, in which the upper housing is detached, a fuel filler nozzle of gasoline is inserted.

How the misfueling preventing apparatus of this embodiment works is explained. The smallest linear distance between a tip of the first trigger projection 221 and a tip of the second trigger projection 231 is described as a smallest distance DM as illustrated in FIG. 5. An outer diameter of the fuel filler nozzle 3 of the light diesel oil is described as an outer diameter DL as illustrated in FIG. 14. An outer diameter of the fuel filler nozzle 4 of the gasoline is described as an outer diameter DS as illustrated in FIG. 16. The smallest distance DM of the first trigger projection 221 and the second trigger projection 231 is smaller than the outer diameter DL, and is larger than the outer diameter DS.

Therefore, the fuel filler nozzle 3 of light diesel oil is able to push the first trigger projection 221 and the second trigger projection 231 at the same time. However, the fuel filler nozzle 4 of gasoline is able to push either one of the first trigger projection 221 and the second trigger projection 231. The misfueling preventing apparatus 2 of this embodiment distinguishes the outer diameter of a fuel filler nozzle depending on the fuel filler nozzle is able to push both of the first trigger projection 221 and the second trigger projection 231 at the same time or push either one of them.

The stopper 236 of the second link arm 23 is put under the stopper projection 243 of the flapper 2 when the fuel filler nozzle 3 is not inserted. The flapper does not open in this state. If the fuel filler nozzle 3 having the outer diameter DL is inserted from the fuel filler port 1, a tip of the fuel filler nozzle 3 passed through the guiding hole 261 pushes the inclining faces 222,232 of the first trigger projection 221 and the second trigger projection 231 to have the first trigger projection 221 and the second trigger projection displaced away from each other. The first link arm 22 swings to the right side in FIG. 14 about the pivot shaft 212 as a center. The second link arm 23 swings to left side by the shaft hole 233 being pulled with the joining shaft 223 of the first link arm 22 to the right side, and by the second trigger projection 231 being pushed to left side. The first link arm 22 and the second link arm 23 displace to opening direction to have the stopper 236 displaced away from the receiving hook 216. Since the stopper 236 and the pivot shaft 212 are arranged at one end of the first link arm 22 and another end of the second link arm 23, and are close to each other, swing motion of each link arm is amplified at a maximum and transmits to the stopper 236. As a result of this, the stopper 236 largely displace away from the receiving hook 216. The first link arm 22 and the second link arm 23 function as a bent link whose base end is at the pivot shaft 212 and whose tip end is the stopper 236. If the fuel filler nozzle 3 is inserted, the link swings about the pivot shaft 236 as a center to displace the stopper 236 away from the receiving hook 216.

Figure 15:
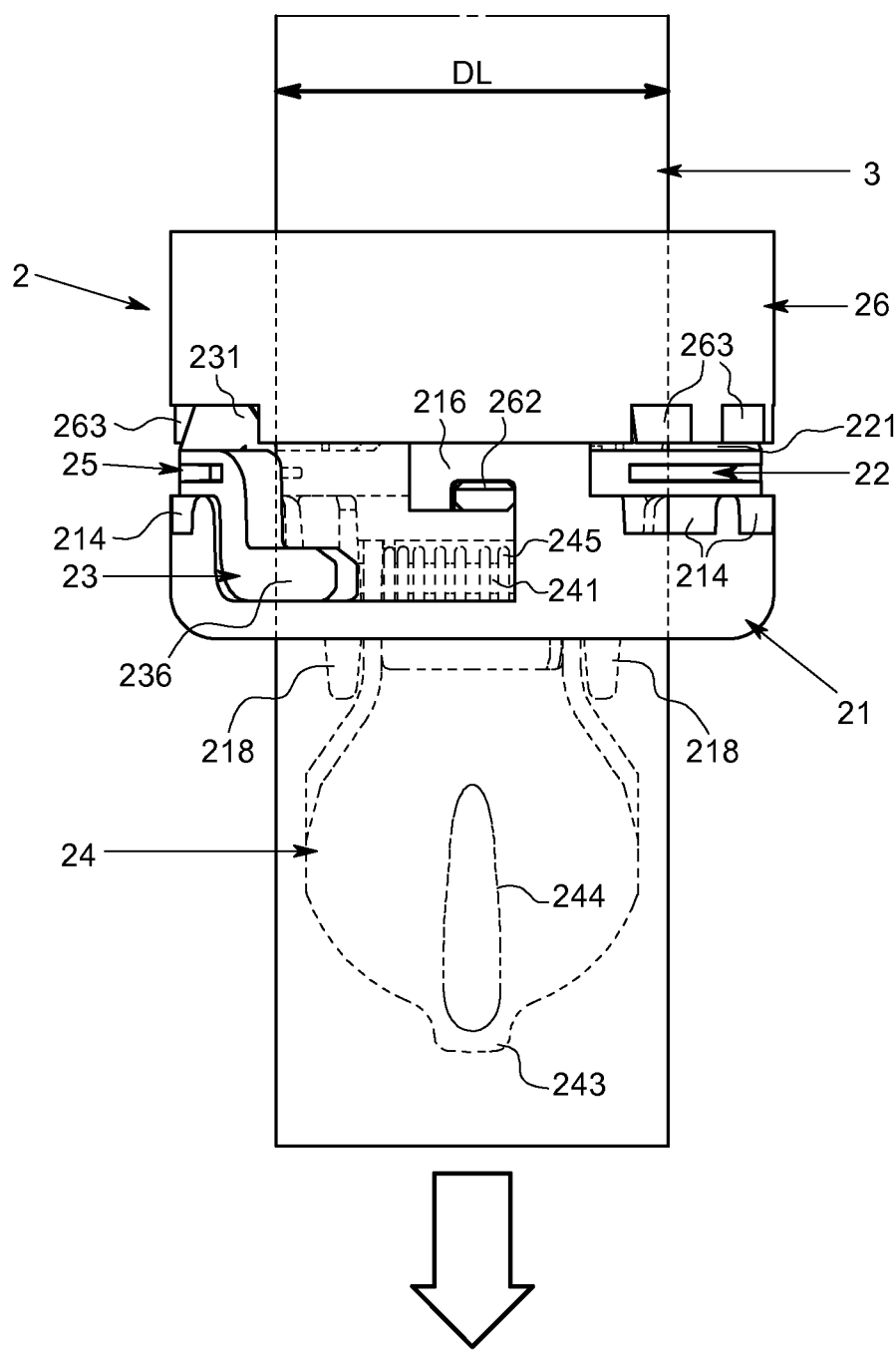
FIG. 15 is a side view illustrating the misfueling preventing apparatus of FIG. 1, in which the upper housing is detached, the fuel filler nozzle of light diesel oil is inserted.

The fuel filler nozzle 3 is more deeply inserted, the tip of the fuel filler nozzle 3 goes through the inclining faces 222,232 of the first trigger projection 221 and the second trigger projection 231. Then tips of the first trigger projection 221 and the second trigger projection 231 abut to a lateral face of the fuel filler nozzle 3. During course of this insertion, the first link arm 22 and the second link arm 23 swing further to the opening direction. As a result of this, the stopper 236 provided on another end of the second link arm 23 largely displaces away for the receiving hook 216 to disconnect the stopper 236 from the stopper projection 243 of the flapper 24. This enables the flapper 24 to rotate to the lower side by being pushed with the nozzle 3, as illustrated in FIG. 15. If the fuel filler nozzle 3 is deeply inserted, the fuel filler nozzle 3 reaches to the fuel filler pipe 12 while the flapper 24 rotating to lower side.

The first link arm 22 and the second link arm 23 are biased to closing direction with the elastic ring 25 in a state that the fuel filler nozzle 3 is inserted to the fuel filler pipe 12. The flapper 24 is biased to the closing position with the torsion coil spring 245. The first link arm 22 and the second link arm 23 are prevented from swinging to closing direction with the fuel filler nozzle 3. The flapper 24 is prevented from rotating to the closing position with the fuel filler nozzle 3. Once the fuel filler nozzle 3 is pulled out, flapper 24 rotates to closing position with the torsion coil spring 245. The first link arm 22 and the second link arm 23 swing to closing direction with the elastic ring 25 to have the stopper 236 of the second link arm 23 slide under the stopper projection 243 of the flapper 24 and lock the flapper 24.

Figure 17:
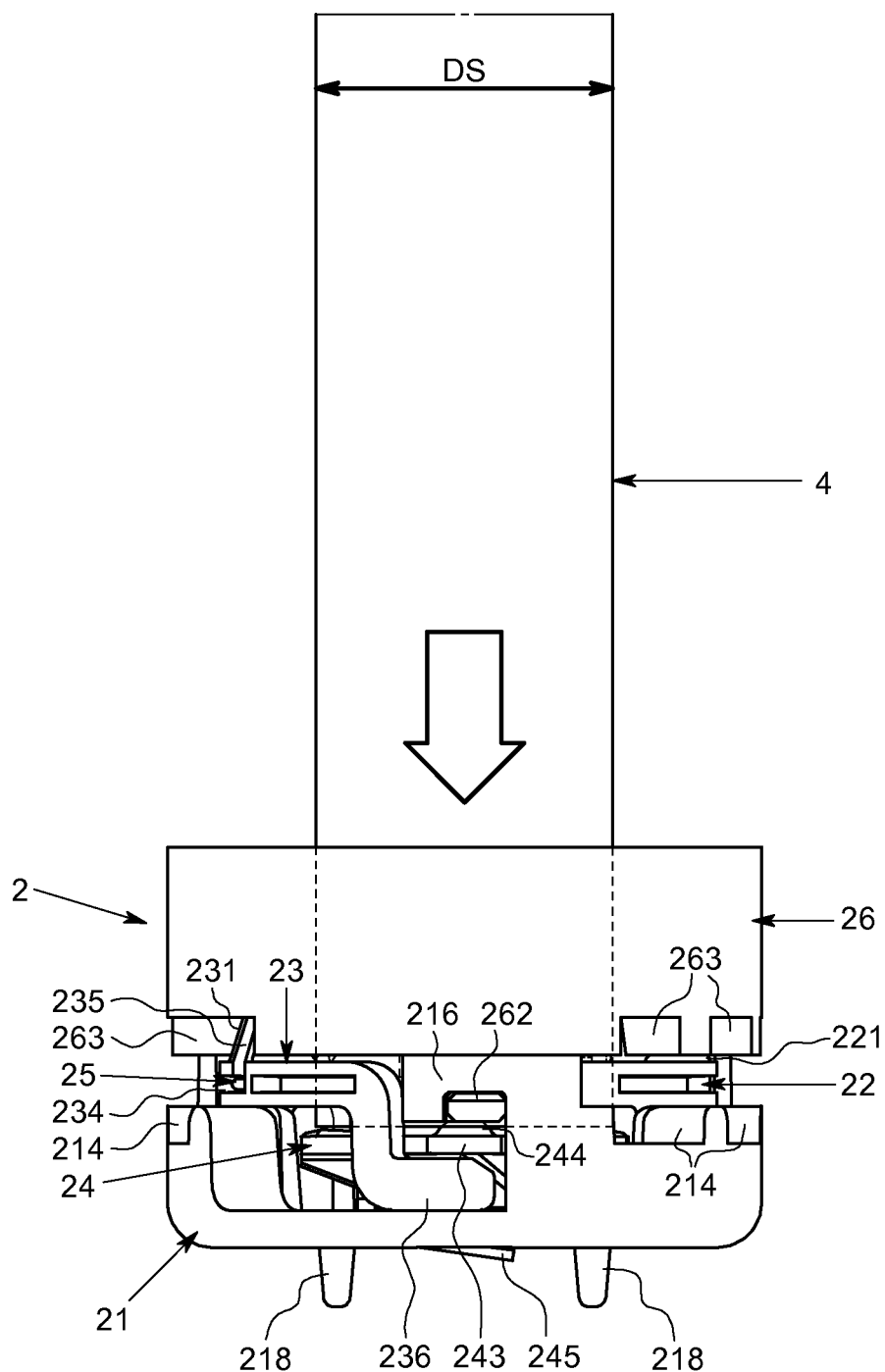
FIG. 17 is a side view illustrating the misfueling preventing apparatus of FIG. 1, in which the upper housing is detached, the fuel filler nozzle of gasoline is inserted.

A state that the fuel filler nozzle 4 having the outer diameter DS is inserted into the base 21 via the guiding hole 261 is illustrated in FIGS. 16 and 17, in which a rotation of the flapper 24 is locked with the stopper 236. Since the fuel filler nozzle 4 having the outer diameter DS is smaller than the shortest distance DM between the first trigger projection 221 and the second trigger projection 231, the fuel filler nozzle 4 is not able to push the first trigger projection 221 and the second trigger projection 231 at the same time. Therefore, the fuel filler nozzle 4 is not able to swing the first link arm 22 and the second link arm 23 to the opening direction to largely displace the stopper 236 away from the receiving hook 216. As illustrated in FIG. 17, the fuel filler nozzle 4 cannot open the flapper 24 even though the tip of the fuel filler nozzle 4 pushes the flapper 24 since the stopper projection 243 contacts the stopper 236.

Figure 18:
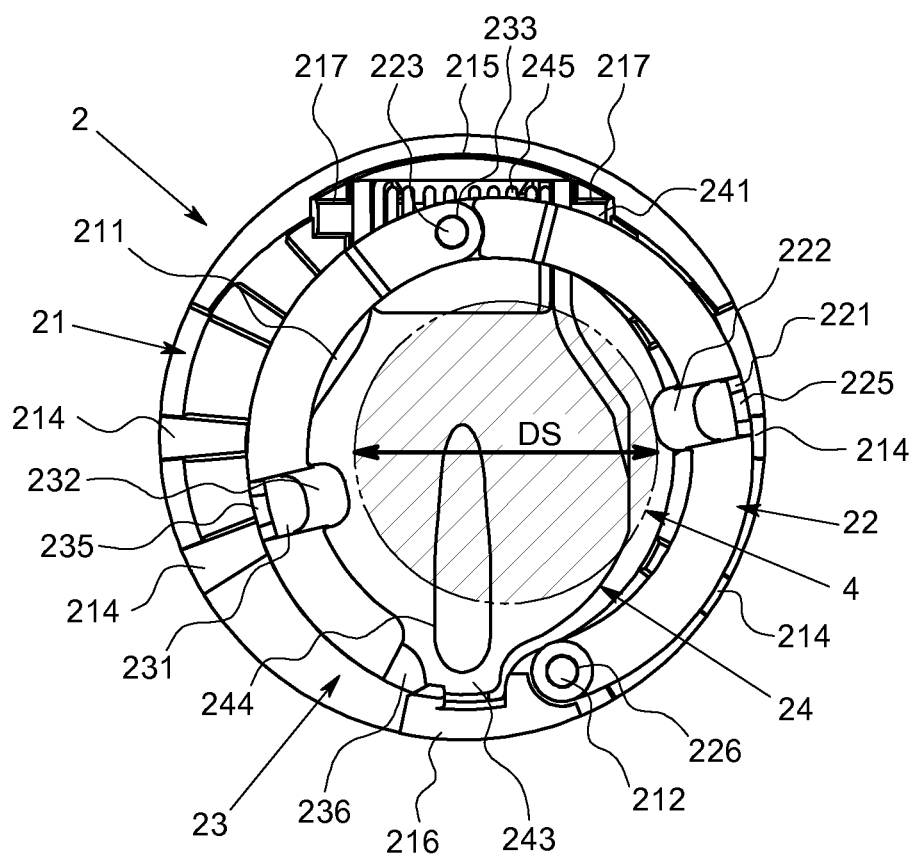
FIG. 18 is a plain view illustrating the misfueling preventing apparatus of FIG. 1, in which the upper housing is detached, the fuel filler nozzle of gasoline is inserted at a position deviating to the first link arm.
Figure 19:
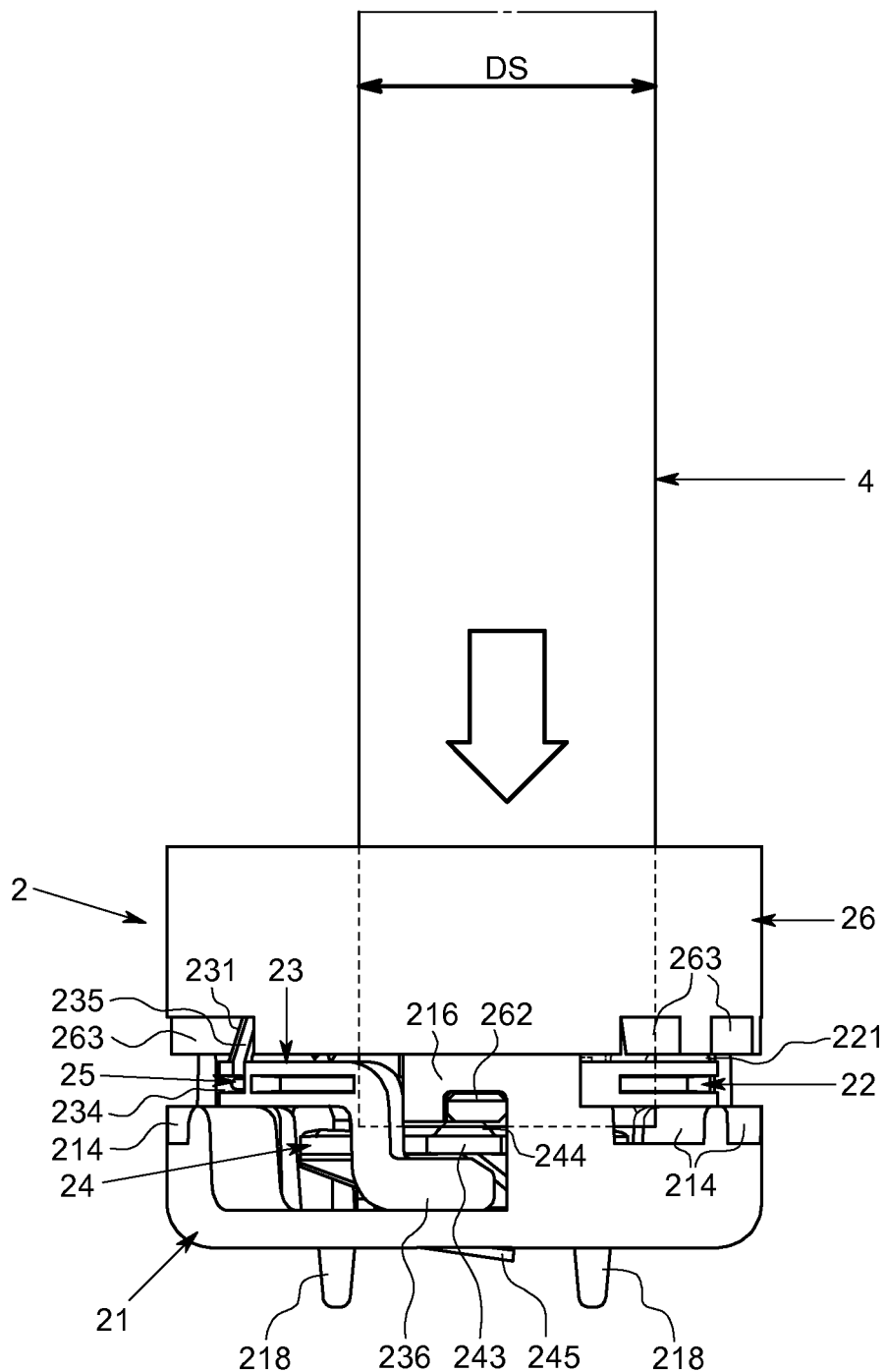
FIG. 19 is a side view illustrating the misfueling preventing apparatus of FIG. 1, in which the upper housing is detached, the fuel filler nozzle of gasoline is inserted at a position deviating to the first link arm.

Even though the fuel filler nozzle 4 of gasoline is inserted at a position deviating to right side and pushes the first trigger projection 221, as illustrated in FIGS. 18 and 19, lock of the flapper 24 is not released. If the fuel filler nozzle 4 pushes the inclining face 222 of the first trigger projection 222, the first link arm 22 swings to right side about the pivot shaft 212 as a center. Since the second link arm 23 is biased to closing direction with the enlarged elastic ring 25 generating a biasing force, the second link arm 23 swings to right side by being pulled with the joining shaft 223 of the first link arm 22 and being pushed by the elastic ring 25. Since the joining shaft 233 of the first link arm 22 is not fixed to the base side, the first link arm 22 and the second link arm 23 sing to right side together. Center of the rotation is the pivot shaft 212.

Figure 20:
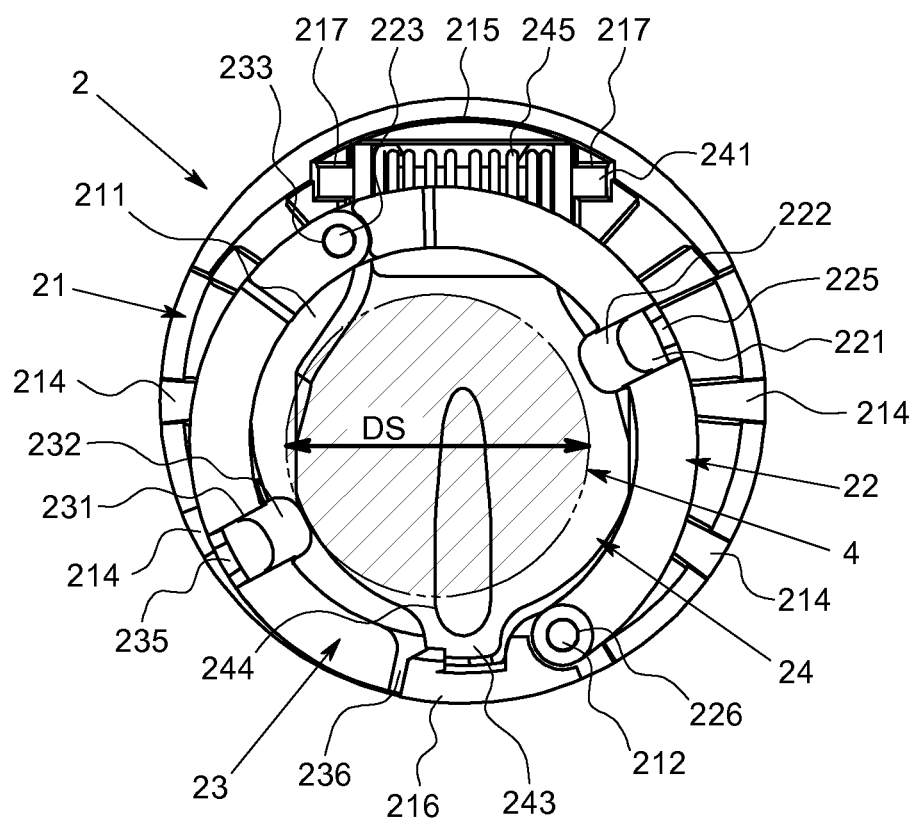
FIG. 20 is a plain view illustrating the misfueling preventing apparatus of FIG. 1, in which the upper housing is detached, the fuel filler nozzle of gasoline is inserted at a position deviating to the second link arm.
Figure 21:
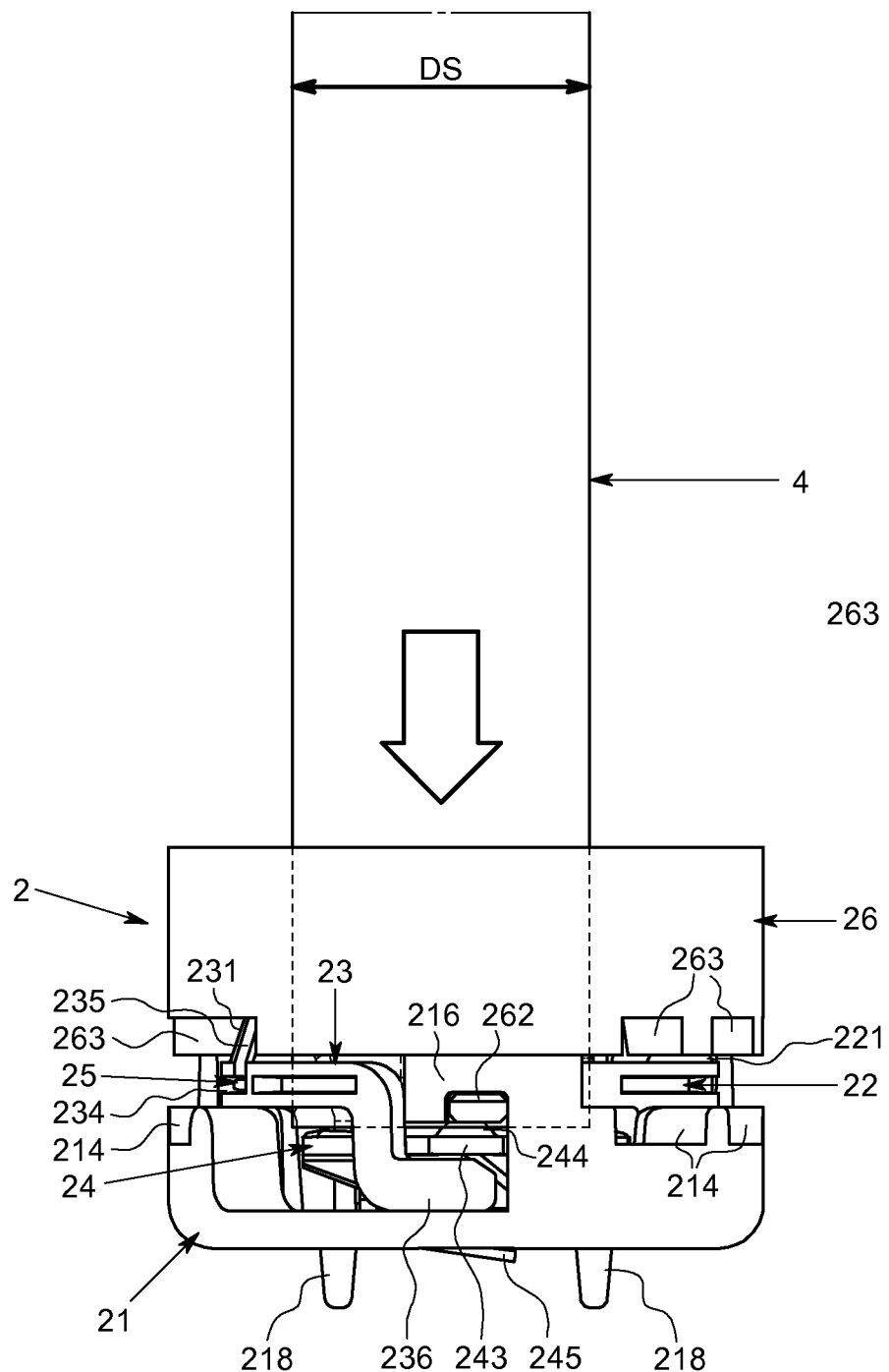
FIG. 21 is a side view illustrating the misfueling preventing apparatus of FIG. 1, in which the upper housing is detached, the fuel filler nozzle of gasoline is inserted at a position deviating to the second link arm.

Even though the fuel filler nozzle 4 of gasoline is inserted at a position deviating to left side and pushes the second trigger projection 231, as illustrated in FIGS. 20 and 21, lock of the flapper 24 is not released as well. If the fuel filler nozzle 4 pushes the inclining face 232 of the second trigger projection 231, the second link arm 23 swings to left side about the pivot shaft 212 as a center. Since the second link arm 22 is biased to closing direction with enlarged elastic ring 25 generating a biasing force, the first link arm 22 swings to left side by being pulled with the shaft hole 233 of the second link arm 23 and being pushed by the elastic ring 25. Since the joining shaft 223 of the first link arm 22 is not fixed to the base side, the first link arm 22 and the second link arm 23 sing to left side together. Center of the rotation is the pivot shaft 212.

Since the stopper 236 of the second link arm 23 is close to the pivot shaft 212, in case either one of the first link arm 22 and the second link arm 23 swings to right side or left side, the stopper 236 hardly displaces. Since the stopper projection 243 of the flapper 24 keeps contacting the stopper 236, the flapper 24 cannot be rotated. As explained above, if the fuel filler nozzle 4 of gasoline is inserted at the position deviated to right side or left side, the flapper 24 cannot be opened.

Instead of the elastic ring 25 of the above explained embodiment, another elastic ring 25c illustrated in FIG. 7 is adaptable. The elastic ring 25c has a linear portion 254 largely bulged to radially outside direction of the through hole 211. The linear portion 254 is supported by a supporting hook 213 provided on a peripheral surface of the base 21. The elastic ring 25c is fitted to the long holes 224,234 of the first link arm 22 and the second link arm 23. Both ends (end portion 253, 243) of the elastic ring 25c are bent to radially outside, and do not engage to the short grooves 225, 235.

Position of the linear portion 254 is fixed by being pressed by a peripheral surface of the upper housing 26. The elastic ring 25c divided into a right arm and left arm at the linear portion 254. If the right arm of the elastic ring 25c enlarges, the right arm generates a biasing force to closing direction, and biases the first link arm 22 to the closing direction. If the left arm of the elastic ring 25c enlarges, the left arm generates a biasing force to closing direction, and biases the second link arm 23 to the closing direction. The right arm and left arm of the elastic ring 25c continues to the linear portion 254 via bending portions on right and left sides. An angle of the bending portions of the elastic ring 25c is smaller than that of elastic ring 25. Since the linear portion 254 is supported by the base 21, the elastic ring 25c has a higher biasing force than the elastic ring 25. The elastic ring 25 occupies smaller space than the elastic ring 25c.

Instead of the flapper 24 of the above explained embodiment, another flapper 24a or flapper 24b illustrated in FIG. 8 or 9 is adaptable. The flapper 24a illustrated in FIG. 8 is provided with a concaved groove 246 on a supporting portion of a stopper projection 243a. The concaved groove 246 is in parallel with the rotation shaft 241 of the flapper 24a. Although the number of the concaved groove is one in the embodiment of FIG. 8, the concaved groove may be plural. The flapper 24b illustrated in FIG. 9 is provided with a pair of first slits 247, 247 along extending direction of a stopper projection 243b. If a fuel filler nozzle is pressed against the flapper 24a or 24b at a load equal to or more than a predetermined load, the concaved groove 246 or the stopper projection 243b elastically deforms. Then the stopper projection 243a or 243b of the flapper 24a or 24b goes over the stopper 236 and rotates to lower side to prevent the flapper 24a or 24b from being destroyed. The flapper 24b illustrated in FIG. 9 has a pair of second slits 248, 248 extending to the direction orthogonal to extending direction of the stopper projection 243b.

What we claim is:

1. A misfueling preventing apparatus discriminating a fuel filler nozzle based on an outer diameter of the fuel filler nozzle, the misfueling preventing apparatus comprising:
    a base provided with a through hole for inserting a fuel filler nozzle, placed across an inserting direction of the fuel filler nozzle to open and close a fuel filler port or a fuel filler pipe;
    a first link arm swung about a pivot shaft whose position is fixed to the base, provided around the through hole of the base, having a shape bending around the through hole of the base, swinging on a plane in parallel with a plane of the through hole, biased against a direction to which the first link arm and a second link arm close, having a first trigger projection projecting to an inside of the through hole of the base;
    the second link arm pivotally jointed to the first link arm with a joining shaft at one end, provided around the through hole to face the first link arm, having a shape bending around the through hole of the base, swinging on the plane in parallel with the plane of the through hole, biased against the direction to which the first link arm and the second link arm close, having a stopper on another end thereof and a second trigger projection projecting to the inside of the through hole of the base; and
    a flapper biased against the through hole of the base, the position of said flapper being rotatably fixed to the base with a rotation shaft, and having a stopper projection;
    wherein a linear distance of the first trigger projection and the second trigger projection facing each other is larger than an outer diameter of a fuel filler nozzle of gasoline, the linear distance is smaller than an outer diameter of a fuel filler nozzle of light diesel oil, and wherein
    the stopper projection of the flapper is supported by the stopper of the second link arm to prevent the flapper from rotating to an opening position, and wherein
    if the fuel filler nozzle of light diesel oil pushes the first trigger projection and the second trigger projection, the first link arm and second link arm swing to a direction to which the first link arm and second link arm open to disconnect the stopper projection and the stopper.

2. The misfueling preventing apparatus according to claim 1, wherein
    each of the first trigger projection and the second trigger projection has an inclining face or an inclining edge on its upper side, the inclining face or the inclining edge descending in the direction of projection of each of the first trigger projection or the second trigger projection.

3. The misfueling preventing apparatus according to claim 1, wherein
    the first link arm and the second link arm are biased to the direction to which the first link arm and the second link arm close with an elastic ring, one portion of the elastic ring engages to the first link arm, another portion of the elastic ring engages to the second link arm, the elastic ring is externally fitted to the first link arm and the second link arm over the joining shaft.

4. The misfueling preventing apparatus according to claim 1, wherein
    the first link arm and the second link arm are biased to the direction to which the first link arm and the second link arm close with an elastic ring having a linear portion, one portion of the elastic ring slidably contacts to the first link arm, another portion of the elastic ring slidably contacts to the second link arm, the elastic ring is externally fitted to the first link arm and the second link arm over the joining shaft, the linear portion of the elastic ring is supported by the base.

5. The misfueling preventing apparatus according to claim 1, wherein
    the flapper is a plate having at least one concaved groove on or next to the stopper projection.

6. The misfueling preventing apparatus according to claim 1, wherein
    the flapper is a plate having at least one pair of slits along an extending direction of the stopper projection.

7. The misfueling preventing apparatus according to claim 1 further comprising an upper housing coupled to the base, wherein the first link arm and the second link arm are supported by a plurality of supporting projections provided on the base and a plurality of supporting projections provided on the upper housing, from which the first link arm and the second link arm swing.

8. The misfueling preventing apparatus according to claim 1, wherein
    the apparatus further comprising a spacer, the spacer is externally fitted to the base.

9. The misfueling preventing apparatus according to claim 1, wherein
    the stopper projection of the flapper is provided on a tip side opposite the position where said flapper is rotatably fixed to a base end side with a rotation shaft,
    the joining shaft joining the first link arm and the second link arm is on the base end side proximate to the position where said flapper is rotatably fixed to the base with a rotation shaft, the pivot shaft and the stopper are on the tip side so that the first link arm and the second link arm open at the stopper.

10. The misfueling preventing apparatus according to claim 1, wherein the first link arm is substantially semi-circular in shape and the second link arm is substantially semi-circular in shape, and configured to form a circular link.

* * * * *